(12) United States Patent
Rowan et al.

(10) Patent No.: US 9,067,576 B2
(45) Date of Patent: Jun. 30, 2015

(54) HYDRAULIC POWERED PARK BRAKE SYSTEM

(75) Inventors: Richard Randall Rowan, Naperville, IL (US); Steven Randall Lovell, Fort Wayne, IN (US); Anton Leonard Rogness, III, Fort Wayne, IN (US); Dale A Thomas, Bloomington, IL (US); Anthony J Casale, Wauconda, IL (US); David A Dornbach, Waukesha, WI (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 464 days.

(21) Appl. No.: 13/592,931

(22) Filed: Aug. 23, 2012

(65) Prior Publication Data
US 2013/0069423 A1 Mar. 21, 2013

Related U.S. Application Data

(60) Provisional application No. 61/535,537, filed on Sep. 16, 2011.

(51) Int. Cl.
*B60T 13/22* (2006.01)
*B62D 5/07* (2006.01)
*B60T 13/16* (2006.01)
*B62D 5/08* (2006.01)

(52) U.S. Cl.
CPC . *B60T 13/22* (2013.01); *B62D 5/07* (2013.01); *B60T 13/16* (2013.01); *B62D 5/08* (2013.01)

(58) Field of Classification Search
CPC ........... B60T 13/22; B60T 13/16; B62D 5/07; B62D 5/08
USPC .................................. 303/2, 10, 71; 180/442
See application file for complete search history.

(56) References Cited

U.S. PATENT DOCUMENTS

| | | | | |
|---|---|---|---|---|
| 2,875,843 | A * | 3/1959 | Price | 180/442 |
| 3,915,186 | A | 10/1975 | Thomas | |
| 4,072,360 | A * | 2/1978 | Carroll et al. | 303/2 |
| 4,451,095 | A * | 5/1984 | Chichester et al. | 303/71 |
| 4,722,575 | A * | 2/1988 | Graham | 303/2 |
| 4,749,236 | A * | 6/1988 | Graham | 303/2 |
| 4,838,376 | A * | 6/1989 | Klein et al. | 180/422 |
| 5,293,952 | A | 3/1994 | Ledamoisel et al. | |
| 7,273,136 | B2 * | 9/2007 | Goto et al. | 188/170 |
| 2001/0048245 | A1 * | 12/2001 | Trzmiel et al. | 303/119.1 |
| 2007/0188013 | A1 * | 8/2007 | Hoffman et al. | 303/10 |
| 2010/0181824 | A1 * | 7/2010 | Bender et al. | 303/11 |

* cited by examiner

*Primary Examiner* — Thomas Irvin
(74) *Attorney, Agent, or Firm* — Jeffrey P. Calfa; Mark C. Bach

(57) ABSTRACT

A hydraulic circuit for a motor vehicle supports operation of a power steering gear and a power assisted park brake unit incorporating a spring actuated hydraulic release (SAHR) chamber. The hydraulic circuit includes a pump with the power steering gear being connected to receive hydraulic fluid under pressure from the pump. Hydraulic fluid from the pump is delivered to first and second valves, the first or release control valve being connected to the SAHR chamber and the second or recirculation valve being coupled to return hydraulic fluid to a pump inlet.

12 Claims, 1 Drawing Sheet

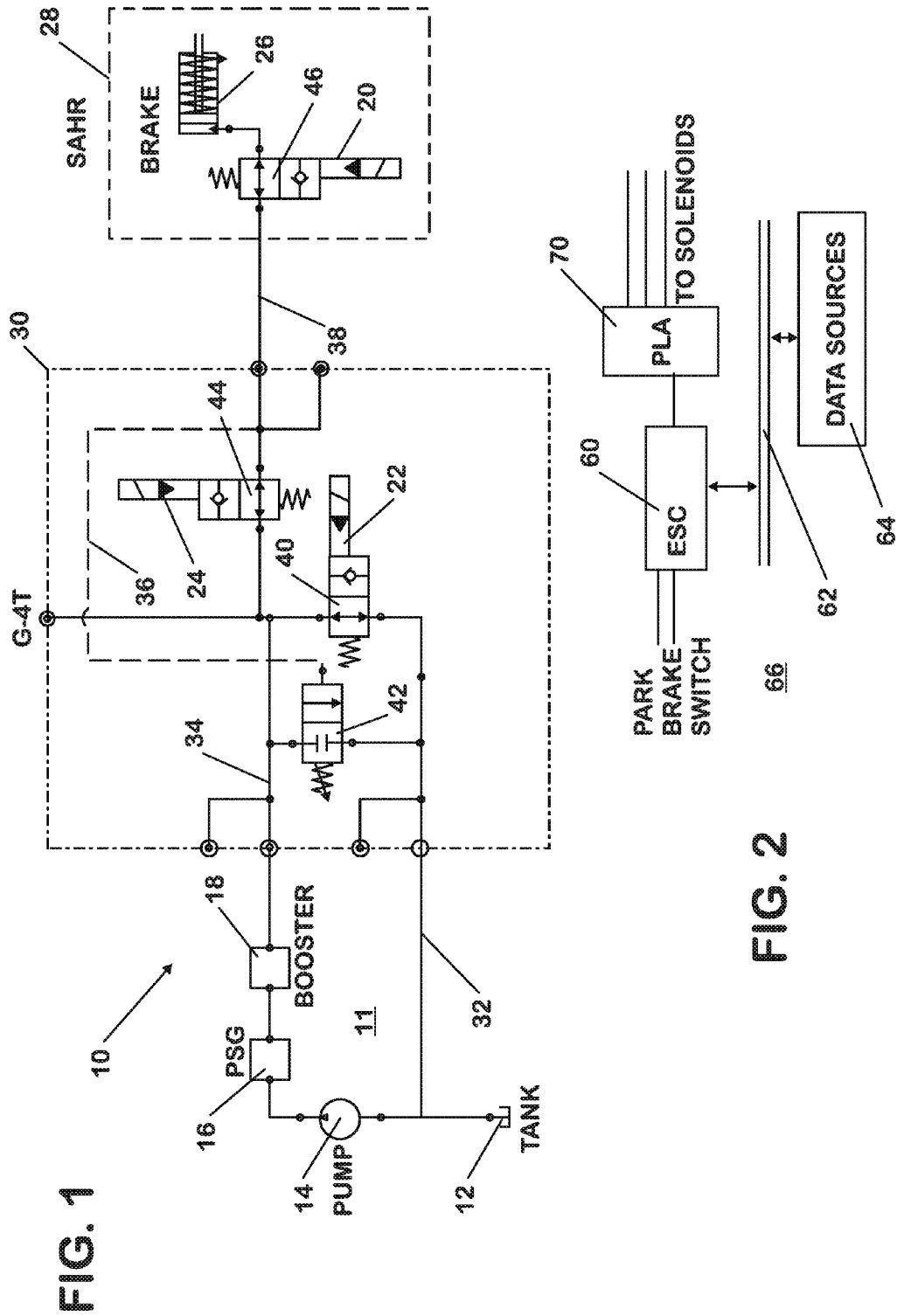

HYDRAULIC POWERED PARK BRAKE SYSTEM

CLAIM OF PRIORITY

This application claims priority under 35 U.S.C. Sec. 119(e) from U.S. Provisional Application Ser. No. 61/535,537 filed 16 Sep. 2011 and titled Hydraulic Powered Park Brake System.

BACKGROUND

1. Technical Field

The technical field relates to hydraulic powered park brake systems.

2. Description of the Technical Field

Park brakes on some vehicles are based on a spring actuated, hydraulic release (SAHR) brake chamber. In such systems the removal of hydraulic pressure results in a spring operating to apply the park brake and the application of hydraulic pressure releases the brake. Examples of such systems powered an engine driven hydraulic pump for the vehicle service brake system are known to the art. Some powered hydraulic service brake systems include an accumulator which provides pressurized hydraulic fluid when the hydraulic pump is unavailable. In systems which provide an accumulator pressurized fluid can be tapped from the accumulator and applied by operator control to release the SAHR chamber from a default, applied condition without operator effort to supply hydraulic system pressure. SAHR brake chambers to support powered park brake systems, while effective, have largely been limited to vehicles with hydraulic foundation brake systems.

SUMMARY

A hydraulic circuit includes a power steering gear, a hydraulic brake booster and a power actuated park brake unit incorporating a spring actuated, hydraulic release (SAHR) chamber. The hydraulic circuit includes a pump with the power steering gear being connected to receive hydraulic fluid under pressure from the pump. Hydraulic fluid from the pump is delivered to first and second valves, the first (a pressure trap) valve being connected to the SAHR chamber and the second (a primary recirculation) valve being coupled to return hydraulic fluid to a pump inlet. A pressure actuated recirculation valve having a pressure responsive control input may be connected in parallel with the primary recirculation valve. The pressure actuated recirculation valve has a pressure input responsive to hydraulic fluid pressure on a connection between the pressure trap valve and a release control valve in the SAHR chamber. A feedback line may be provided which taps the connection between the release control valve and the pressure trap valve. The feedback line is connected to the pressure input of the pressure actuated recirculation valve.

BRIEF DESCRIPTION OF THE DRAWINGS

FIG. 1 is a schematic of a hydraulic circuit.

FIG. 2 is a high level block diagram of a control system for control of the hydraulic circuit of FIG. 1.

DETAILED DESCRIPTION

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Referring now to the figures and in particular to FIG. 1, a hydraulic circuit 10 is shown. Hydraulic circuit 10 provides power assist for steering, power assist for the vehicle service brakes (not shown) and for operator operation of a park brake unit 28 on a motor vehicle (not shown). Hydraulic circuit 10 includes a hydraulic fluid return line 32 which feeds hydraulic fluid to a hydraulic fluid reservoir/tank 12 and to a pump 14 which drives circulation of the hydraulic fluid. Pump 14 may be driven by a vehicle engine (not shown) or by an electric motor (not shown).

Pump 14 delivers hydraulic fluid under pressure to a power steering gear (PSG) 16 and through the power steering gear to a brake booster unit 18. Brake booster unit 18 relates to a service brake circuit (not shown). From the brake booster unit 18 some hydraulic fluid can flow into an outlet line 34. Hydraulic fluid flow control from outlet line 34 is determined by the positions of various valves connected to the outlet line 34 and to an release control line 38. All of the valves include spring return elements and have open and closed positions.

Two valves are connected in parallel between the outlet line 34 and the return line 32. These are recirculation valve 40 and a pressure actuated recirculation valve 42. Opening and closing of recirculation valve 40 is controlled by a release control valve solenoid 22. Opening and closing of pressure actuated recirculation valve 42 is controlled by pressure changes on a pressure feedback line 36. When recirculation valve 40 and pressure actuated recirculation valve 42 are open they allow hydraulic fluid to circulate back to return line 32 and to tank 12 from which it can be drawn by pump 14. The provision of parallel valves between the outlet line 34 and the return line 32 mitigates possible blockage of the circuit should contaminants enter the system and become trapped in one of the two valves.

Two valves are connected in series between the outlet line 34 to the spring actuated hydraulic release (SAHR) chamber 26 in park brake unit 28. These valves are a pressure trap valve 44 which is actuated by a pressure trap valve solenoid 24 and a release control valve 46 which is actuated by a release control valve solenoid 20. Hydraulic fluid flows through pressure trap valve 44 along release control line 38 to release control valve 46. Release control valve 46 is supplied as part of the park brake unit 28. Feedback line 36 taps release control line 38 and is connected to a control input of the pressure actuated recirculation valve 42.

Trap valve 44, recirculation valve 40, pressure actuated recirculation valve 42, the feedback line 36, an extension to release control line 38, an extension to outlet line 34 and an extension of return line 32 are packaged as an adapter interface 30 between an open circuit hydraulic powered steering system 11 and park brake unit 28.

Solenoids 20, 22 and 24 operate in response to operation of park brake switch 66 (shown in FIG. 2) and function to position valves 46, 44 and 40 depending upon whether the park brake unit 28 is to be released or applied. The default state of the park brake unit 28 is applied as urged by a spring in SAHR chamber 26. The park brake unit 28 is released by directing hydraulic fluid under pressure into SAHR chamber 26. When park brake switch 66 is moved to a position indicating selection of the released state by an operator, assuming any interlock condition stemming from vehicle operational condition which relates to parking brake unit 28 release has been met, solenoids 24 and 20 are energized. An example of a vehicle condition which may release an interlock is that a pump 14 prime mover is operational.

Solenoids 24 and 20 are not energized at the beginning of the park brake release command sequence, the valves 44, 46 to which they relate are simply in an open condition by default. The command sequence effecting release of the parking brake units 28 provides that first recirculation valve solenoid 22 is energized to close recirculation valve 40. At this point is operated to open pressure trap valve 44 and release control valve 46, respectively, directing hydraulic fluid under pressure into SAHR chamber 26 to release the brake. Concurrently recirculation valve solenoid 22 is energized to close recirculation valve 40. With this step hydraulic fluid begins to fill the SAHR chamber 26. At some point the pressure builds to where valve 42 opens from pressure on the feedback line 36 and solenoid 20 is energized to close the release control valve 46 to hold the brake in a released condition. The trap valve 44 is closed by operation of solenoid 24 as a back up to closure of the release control valve 46. Solenoid 22 is deenergized to open recirculation valve 40.

Upon initial opening of trap valve 44 and release control valve 46 pressure in the feedback line 36 falls. This fall in pressure results in pressure actuated recirculation valve 42 closing. As the SAHR chamber 26 fills and pressure first builds on the feedback line 36 and, eventually, is trapped there, pressure actuated valve 42 reopens providing a circulation path for hydraulic fluid parallel to that through recirculation valve 40. This provides built in redundancy.

Applying the parking brake upon operator request is done by draining the SAHR chamber 26. To do this case the release control valve 46 and the trap valve 44 are opened by de-energizing the respective solenoids 20 and 24 while leaving solenoid 40 open. This allows hydraulic fluid to drain to tank 12 taking pressure off the system.

FIG. 2 illustrates a simplified control system incorporating an electronic system controller (ESC) 60 which is connected over a data link/bus 62 to a variety of vehicle data sources 64, which in turn provide data relating to vehicle engine status, speed, etc. These values may in turn control application of interlocks which in turn may limit operator selection of park brake position through switch 66. A programmable array logic (PAL) element 70 may be programmed to respond to an on/off or state signal from ESC 60 to cycling the appropriate energization signal levels to solenoids 20, 22 and 24. Application of energization to solenoids 20 and 24 for park brake release is usually staggered with release control valve solenoid 20 being energized just before trap valve solenoid 24 to assure pressure build up on feedback line 36 and to prevent rebound into the release control line 38 with a loss of pressure.

What is claimed is:

1. A hydraulic circuit for supporting operation of a power assisted steering and a power assisted park brake application, the hydraulic circuit comprising:
    a spring actuated hydraulic release chamber;
    a pump for pumping hydraulic fluid;
    a power steering gear connected to receive hydraulic fluid under pressure from the pump;
    a recirculation valve for selectively coupling hydraulic fluid from the power steering gear back to the pump; and
    a release control valve for selectively coupling hydraulic fluid from the power steering gear to the spring actuated hydraulic release chamber.

2. A hydraulic circuit as set forth in claim 1, further comprising:
    a trap valve connected between the power steering gear and the release control valve.

3. A hydraulic circuit as set forth in claim 2, further comprising:
    a pressure actuated recirculation valve having a pressure responsive control input, the pressure actuated recirculation valve being connected in parallel with the recirculation valve to recirculate hydraulic fluid through the pump; and
    a feedback line tapped to a connection between the trap valve and the release control valve, the feedback line being coupled to the pressure input of the pressure actuated recirculation valve.

4. A hydraulic circuit as set forth in claim 3, further comprising a control system.

5. A hydraulic circuit as set forth in claim 4, the control system comprising:
    a solenoid for opening and closing the trap valve;
    a solenoid for opening and closing the release control valve;
    a solenoid for opening and closing the recirculation valve;
    an operator switch for setting and releasing a park brake;
    a programmable logic array connected to apply control signals to the solenoids; and
    an electronic system controller responsive to the operator switch for applying a state signal to the programmable logic array for cycling the control signals.

6. A powered park brake and power steering assist system comprising:
    a return line for hydraulic fluid;
    a pump connected to draw hydraulic fluid from the return line;
    a power steering gear connected to receive hydraulic fluid under pressure from the pump;
    a spring actuated hydraulic release chamber;
    an release control line connected to deliver hydraulic fluid to the spring actuated hydraulic release chamber;
    an outlet line from the power steering gear;
    a trap valve connected for transmission of hydraulic fluid between the outlet line and the release control line;
    a release control valve connected to the release control line;
    a recirculation valve connected for transmission of hydraulic fluid from the outlet line to the return line;
    a pressure actuated recirculation valve having a pressure responsive control input and connected for transmission of hydraulic fluid from the outlet line to the return line; and
    a pressure feedback line connected between the release control line and the pressure responsive control input of the pressure actuated recirculation valve.

7. A powered park brake and power steering assist system as set forth in claim 6, further comprising:
    a solenoid for opening and closing the trap valve;
    a solenoid for opening and closing the release control valve;
    a solenoid for opening and closing the recirculation valve;
    an operator switch for setting and releasing a park brake;
    programmable array logic connected to apply control signals to the solenoids; and
    an electronic system controller responsive to the operator switch for applying a state signal to the programmable array logic for cycling the control signals.

8. A powered park brake and power steering assist system as set forth in claim 7, further comprising:
    sources of vehicle operating variables; and
    the electrical system controller being programmed to provide interlocks relating to response to operation of the operator switch.

9. A system for providing powered park brake operation, the system comprising:

an open circuit power steering system;

a spring actuated hydraulic release chamber;

a recirculation valve for selectively coupling hydraulic fluid received from the power steering hydraulic circuit back to the power steering hydraulic circuit;

a release control valve for selectively coupling hydraulic fluid from the power steering hydraulic circuit to the spring actuated hydraulic release chamber;

a pressure actuated recirculation valve having a pressure responsive control input, the pressure actuated recirculation valve being connected in parallel with the recirculation valve to recirculate hydraulic fluid through the pump;

a trap valve connecting the power steering hydraulic circuit to the release control valve; and a feedback line tapped to a connection between the release control valve and the trap valve, the feedback line providing the pressure input of the pressure actuated recirculation valve.

10. A system for providing powered park brake operation as set forth in claim 9, the system further comprising:
a trap valve connected between the spring actuated hydraulic release chamber and the release control valve.

11. A system for providing powered park brake operation as set forth in claim 10, the system further comprising a control system.

12. A system for providing powered park brake operation as set forth in claim 11, the control system further comprising:
a solenoid for opening and closing the trap valve;
a solenoid for opening and closing the release control valve;
a solenoid for opening and closing the recirculation valve;
an operator switch for setting and releasing a park brake;
programmable array logic connected to apply control signals to the solenoids; and
an electronic system controller responsive to the operator switch for applying a state signal to the programmable logic array for cycling the control signals.

\* \* \* \* \*